(12) United States Patent
Rouse et al.

(10) Patent No.: US 10,339,294 B2
(45) Date of Patent: *Jul. 2, 2019

(54) CONFIDENCE-BASED AUTHENTICATION

(71) Applicant: JPMorgan Chase Bank, N.A., New York, NY (US)

(72) Inventors: John D. Rouse, Westerville, OH (US); Raymond P. Delaney, Newark, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/209,021

(22) Filed: Jul. 13, 2016

(65) Prior Publication Data

US 2016/0321446 A1    Nov. 3, 2016

Related U.S. Application Data

(63) Continuation of application No. 14/216,315, filed on Mar. 17, 2014, now Pat. No. 9,419,957.

(60) Provisional application No. 61/798,178, filed on Mar. 15, 2013.

(51) Int. Cl.
*G06F 21/36* (2013.01)
*H04L 29/06* (2006.01)
*G06F 21/31* (2013.01)
*G06F 21/32* (2013.01)

(52) U.S. Cl.
CPC ............ *G06F 21/36* (2013.01); *G06F 21/316* (2013.01); *G06F 21/32* (2013.01); *H04L 63/08* (2013.01); *H04L 63/0861* (2013.01); *H04L 63/10* (2013.01); *H04L 63/20* (2013.01)

(58) Field of Classification Search
None
See application file for complete search history.

(56) References Cited

U.S. PATENT DOCUMENTS

| | | |
|---|---|---|
| 3,705,385 A | 12/1972 | Batz |
| 3,860,870 A | 1/1975 | Furuya |
| 3,896,266 A | 7/1975 | Waterbury |
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |

(Continued)

FOREIGN PATENT DOCUMENTS

| | | |
|---|---|---|
| CA | 2430549 | 6/2002 |
| DE | 19731293 | 1/1999 |

(Continued)

OTHER PUBLICATIONS

ABC News Internet Ventures, Getting Smart with Java, http://abcnews.go.com/sections/DailyNews/amex_java000606.html (last visited Jun. 6, 2000).

(Continued)

*Primary Examiner* — Farid Homayounmehr
*Assistant Examiner* — Olanrewaju J. Bucknor
(74) *Attorney, Agent, or Firm* — Calfee, Halter & Griswold LLP

(57) ABSTRACT

Methods, systems and computer program products for confidence-based user authentication are provided.

16 Claims, 3 Drawing Sheets

(56) References Cited

U.S. PATENT DOCUMENTS

| | | |
|---|---|---|
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,212,792 A | 5/1993 | Gerety et al. |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,315,504 A | 5/1994 | Lembie |
| 5,317,683 A | 5/1994 | Hager et al. |
| 5,321,841 A | 6/1994 | Eat |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davies et al. |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakley et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scarmer |
| 5,642,419 A | 6/1997 | Rosen |
| 5,644,493 A | 7/1997 | Motai |
| 5,644,778 A | 7/1997 | Burks et al. |
| 5,649,118 A | 7/1997 | Carlisle et al. |
| 5,653,914 A | 8/1997 | Holmes et al. |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,706,452 A | 1/1998 | Ivanov |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray |
| 5,761,647 A | 6/1998 | Boushy |
| 5,761,661 A | 6/1998 | Coussenns |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,793,861 A | 9/1998 | Haigh |
| 5,794,178 A | 9/1998 | Caid |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Mashayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,023 A | 10/1998 | Hall et al. |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |

(56) References Cited

U.S. PATENT DOCUMENTS

| | | |
|---|---|---|
| 5,828,812 A | 10/1998 | Khan et al. |
| 5,828,833 A | 10/1998 | Belville et al. |
| 5,832,211 A | 11/1998 | Blakley, III et al. |
| 5,832,460 A | 11/1998 | Bednar |
| 5,832,476 A | 11/1998 | Tada |
| 5,835,580 A | 11/1998 | Fraser |
| 5,835,603 A | 11/1998 | Coutts |
| 5,838,903 A | 11/1998 | Blakely, III et al. |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,190 A | 12/1998 | Kleehammer et al. |
| 5,848,400 A | 12/1998 | Change |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,862,323 A | 1/1999 | Blakely, III et al. |
| 5,864,830 A | 1/1999 | Armetta et al. |
| 5,864,871 A | 1/1999 | Kitain et al. |
| RE36,116 E | 2/1999 | McCarthy |
| 5,866,889 A | 2/1999 | Weiss et al. |
| 5,870,718 A | 2/1999 | Spector |
| 5,870,725 A | 2/1999 | Belinger et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Change |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader et al. |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,952,639 A | 7/1999 | Ohki |
| 5,933,817 A | 8/1999 | Hucal |
| 5,933,823 A | 8/1999 | Cullen |
| 5,940,812 A | 8/1999 | Tengel et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,933,816 A | 9/1999 | Zeanah |
| 5,933,827 A | 9/1999 | Cole |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,482 A | 10/1999 | Pham |
| 5,970,483 A | 10/1999 | Evans |
| 5,978,467 A | 11/1999 | Walker et al. |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette et al. |
| 5,991,780 A | 11/1999 | Rivette |
| 5,995,948 A | 11/1999 | Whitford |
| 5,995,976 A | 11/1999 | Walker et al. |
| 6,003,762 A | 11/1999 | Hayashida |
| 5,999,596 A | 12/1999 | Walker et al. |
| 5,999,907 A | 12/1999 | Donner |
| 5,999,971 A | 12/1999 | Buckland |
| 6,000,033 A | 12/1999 | Kelly et al. |
| 6,001,016 A | 12/1999 | Walker et al. |
| 6,005,939 A | 12/1999 | Fortenberry et al. |
| 6,006,205 A | 12/1999 | Loeb et al. |
| 6,006,249 A | 12/1999 | Leong |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |
| 6,026,429 A | 2/2000 | Jones et al. |
| 6,032,134 A | 2/2000 | Weissman |
| 6,032,147 A | 2/2000 | Williams et al. |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,065,120 A | 5/2000 | Laursen et al. |
| 6,065,675 A | 5/2000 | Teicher |
| 6,067,531 A | 5/2000 | Daniel et al. |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |
| 6,076,072 A | 6/2000 | Libman |
| 6,081,790 A | 6/2000 | Rosen |

(56) References Cited

U.S. PATENT DOCUMENTS

| | | |
|---|---|---|
| 6,081,810 A | 6/2000 | Rosenzweig et al. |
| 6,081,900 A | 6/2000 | Subramaniam et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,192 A | 7/2000 | Kanevsky et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,111,858 A | 8/2000 | Greaves et al. |
| 6,112,181 A | 8/2000 | Shear et al. |
| 6,115,642 A | 9/2000 | Brown et al. |
| 6,115,690 A | 9/2000 | Wong |
| 6,119,093 A | 9/2000 | Walker et al. |
| 6,119,099 A | 9/2000 | Walker et al. |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A | 10/2000 | Tobin |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Pare et al. |
| 6,161,113 A | 12/2000 | Mora et al. |
| 6,161,182 A | 12/2000 | Nadooshan |
| 6,164,533 A | 12/2000 | Barton |
| 6,170,011 B1 | 1/2001 | Beck et al. |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,220 B1 | 1/2001 | Chen et al. |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,066 B1 | 3/2001 | Barkley |
| 6,202,151 B1 | 3/2001 | Musgrave et al. |
| 6,202,158 B1 | 3/2001 | Urano et al. |
| 6,208,978 B1 | 3/2001 | Walker et al. |
| 6,208,984 B1 | 3/2001 | Rosenthan |
| 6,216,115 B1 | 4/2001 | Barrameda et al. |
| 6,219,639 B1 | 4/2001 | Bakis et al. |
| 6,219,706 B1 | 4/2001 | Fan |
| 6,222,914 B1 | 4/2001 | McMullin |
| 6,223,168 B1 | 4/2001 | McGurl et al. |
| 6,226,623 B1 | 5/2001 | Schein et al. |
| 6,226,679 B1 | 5/2001 | Gupta |
| 6,226,752 B1 | 5/2001 | Gupta et al. |
| 6,227,447 B1 | 5/2001 | Campisano |
| 6,230,148 B1 | 5/2001 | Pare et al. |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,256,664 B1 | 7/2001 | Donoho et al. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,834 B1 | 11/2001 | Gennaro et al. |
| 6,317,838 B1 | 11/2001 | Baize |
| 6,324,524 B1 | 11/2001 | Lent et al. |
| 6,327,573 B1 | 12/2001 | Walker et al. |
| 6,327,578 B1 | 12/2001 | Linehan |
| 6,330,543 B1 | 12/2001 | Kepecs |
| 6,332,192 B1 | 12/2001 | Boroditsky et al. |
| 6,336,104 B1 | 1/2002 | Walker et al. |
| 6,339,423 B1 | 1/2002 | Sampson et al. |
| 6,343,279 B1 | 1/2002 | Bissonette et al. |
| 6,343,323 B1 | 1/2002 | Kalpio et al. |
| 6,345,261 B1 | 2/2002 | Feidelson |
| 6,349,242 B2 | 2/2002 | Mahaffey |
| 6,349,336 B1 | 2/2002 | Sit et al. |
| 6,363,381 B1 | 3/2002 | Lee et al. |
| 6,366,682 B1 | 4/2002 | Hoffman et al. |
| 6,381,587 B1 | 4/2002 | Guzelsu |
| 6,385,591 B1 | 5/2002 | Mankoff |
| 6,385,652 B1 | 5/2002 | Brown et al. |
| 6,401,125 B1 | 6/2002 | Makarios et al. |
| 6,401,211 B1 | 6/2002 | Brezak, Jr. et al. |
| 6,408,389 B2 | 6/2002 | Grawrock et al. |
| 6,411,933 B1 | 6/2002 | Maes et al. |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,446,053 B1 | 9/2002 | Elliott |
| 6,449,765 B1 | 9/2002 | Ballard |
| 6,453,353 B1 | 9/2002 | Win et al. |
| 6,460,141 B1 | 10/2002 | Olden |
| 6,470,357 B1 | 10/2002 | Garcia, Jr. et al. |
| 6,484,149 B1 | 11/2002 | Jammes |
| 6,487,641 B1 | 11/2002 | Cusson et al. |
| 6,490,601 B1 | 12/2002 | Markus et al. |
| 6,493,677 B1 | 12/2002 | Von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,498,657 B1 | 12/2002 | Kuntz et al. |
| 6,507,912 B1 | 1/2003 | Matyas et al. |
| 6,510,523 B1 | 1/2003 | Perlman et al. |
| 6,519,763 B1 | 2/2003 | Kaufer et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,580,814 B1 | 6/2003 | Ittycheriah et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,589,291 B1 | 7/2003 | Boag et al. |
| 6,592,044 B1 | 7/2003 | Wong et al. |
| 6,609,106 B1 | 8/2003 | Robertson |
| 6,609,113 B1 | 8/2003 | O'Leary et al. |
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,640,302 B1 | 10/2003 | Subramaniam et al. |

(56) References Cited

U.S. PATENT DOCUMENTS

| | | | |
|---|---|---|---|
| 6,668,322 B1 | 12/2003 | Wood et al. |
| 6,671,818 B1 | 12/2003 | Mikurak |
| 6,675,261 B2 | 1/2004 | Shandony |
| 6,684,248 B1 | 1/2004 | Janacek et al. |
| 6,684,384 B1 | 1/2004 | Bickerton et al. |
| 6,687,222 B1 | 2/2004 | Albert et al. |
| 6,687,245 B2 | 2/2004 | Fangman et al. |
| 6,697,947 B1 | 2/2004 | Matyas, Jr. et al. |
| 6,714,987 B1 | 3/2004 | Amin et al. |
| 6,718,482 B2 | 4/2004 | Sato et al. |
| 6,718,535 B1 | 4/2004 | Underwood |
| 6,725,269 B1 | 4/2004 | Megiddo |
| 6,735,695 B1 | 5/2004 | Gopalakrishnan et al. |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,763,388 B1 | 7/2004 | Tsimelzon |
| 6,766,370 B2 | 7/2004 | Glommen et al. |
| 6,769,605 B1 | 8/2004 | Magness |
| 6,772,146 B2 | 8/2004 | Khemlani et al. |
| 6,785,810 B1 | 8/2004 | Lirov et al. |
| 6,789,115 B1 | 9/2004 | Singer et al. |
| 6,792,572 B1 | 9/2004 | Frohlick |
| 6,805,288 B2 | 10/2004 | Routhenstein et al. |
| 6,810,395 B1 | 10/2004 | Bharat |
| 6,819,219 B1 | 11/2004 | Bolle et al. |
| 6,820,202 B1 | 11/2004 | Wheeler et al. |
| 6,826,696 B1 | 11/2004 | Chawla et al. |
| 6,832,202 B1 | 12/2004 | Schuyler et al. |
| 6,832,587 B2 | 12/2004 | Wampula et al. |
| 6,847,991 B1 | 1/2005 | Kurapati |
| 6,856,970 B1 | 2/2005 | Campbell et al. |
| 6,868,391 B1 | 3/2005 | Hultgren |
| 6,892,231 B2 | 5/2005 | Jager |
| 6,907,566 B1 | 6/2005 | McElfresh et al. |
| 6,925,481 B2 | 8/2005 | Singhal et al. |
| 6,934,848 B1 | 8/2005 | King et al. |
| 6,937,976 B2 | 8/2005 | Apte |
| 6,938,158 B2 | 8/2005 | Azuma |
| 6,950,936 B2 | 9/2005 | Subramaniam et al. |
| 6,954,932 B2 | 10/2005 | Nakamura et al. |
| 6,957,337 B1 | 10/2005 | Chainer et al. |
| 6,965,939 B2 | 11/2005 | Cuomo et al. |
| 6,976,164 B1 | 12/2005 | King et al. |
| 6,980,962 B1 | 12/2005 | Arganbright et al. |
| 6,983,421 B1 | 1/2006 | Lahti et al. |
| 6,992,786 B1 | 1/2006 | Breding et al. |
| 7,006,983 B1 | 2/2006 | Packes et al. |
| 7,010,512 B1 | 3/2006 | Gillin et al. |
| 7,020,696 B1 | 3/2006 | Perry et al. |
| 7,032,110 B1 | 4/2006 | Su et al. |
| 7,051,199 B1 | 5/2006 | Berson et al. |
| 7,051,330 B1 | 5/2006 | Kaler et al. |
| 7,058,817 B1 | 6/2006 | Ellmore |
| 7,076,453 B2 | 7/2006 | Jammes et al. |
| 7,080,036 B1 | 7/2006 | Drummond et al. |
| 7,086,085 B1 * | 8/2006 | Brown .................. G06F 21/31 714/E11.207 |
| 7,089,203 B1 | 8/2006 | Crookshanks |
| 7,089,208 B1 | 8/2006 | Levchin et al. |
| 7,089,503 B1 | 8/2006 | Bloomquist et al. |
| 7,093,020 B1 | 8/2006 | McCarty et al. |
| 7,093,282 B2 | 8/2006 | Hillhouse |
| 7,103,556 B2 | 9/2006 | Del Rey et al. |
| 7,117,239 B1 | 10/2006 | Hansen |
| 7,124,101 B1 | 10/2006 | Mikurak |
| 7,134,075 B2 | 11/2006 | Hind |
| 7,137,006 B1 | 11/2006 | Grandcolas et al. |
| 7,139,686 B1 | 11/2006 | Critz |
| 7,185,094 B2 | 2/2007 | Marquette et al. |
| 7,188,181 B1 | 3/2007 | Squier et al. |
| 7,197,470 B1 | 3/2007 | Arnett |
| 7,203,909 B1 | 4/2007 | Horvitz et al. |
| 7,299,201 B2 | 11/2007 | Jammes |
| 7,321,864 B1 | 1/2008 | Gendler |
| 7,370,011 B2 | 5/2008 | Bennett |
| 8,006,300 B2 * | 8/2011 | Mizrah .................. G06F 21/36 726/18 |
| 8,346,217 B2 * | 1/2013 | Crawford .............. H04W 12/06 455/410 |
| 8,595,810 B1 * | 11/2013 | Ben Ayed ........... H04L 63/0815 713/168 |
| 8,793,776 B1 * | 7/2014 | Jackson ................ H04W 4/023 726/7 |
| 8,904,506 B1 * | 12/2014 | Canavor ................ G06F 17/30 713/182 |
| 8,925,053 B1 * | 12/2014 | Mehta .................... G06F 21/31 713/155 |
| 9,088,891 B2 * | 7/2015 | Belton ...................... H04L 9/32 |
| 9,118,656 B2 * | 8/2015 | Ting ...................... H04L 63/104 |
| 9,262,621 B1 * | 2/2016 | Subbiah ................ G06F 21/41 |
| 9,294,456 B1 * | 3/2016 | Timmermans ........ H04L 63/083 |
| 9,305,151 B1 * | 4/2016 | Dotan .................... G06F 21/31 |
| 2001/0011255 A1 | 8/2001 | Asay et al. |
| 2001/0012974 A1 | 8/2001 | Mahaffey |
| 2001/0016835 A1 | 8/2001 | Hansmann et al. |
| 2001/0027474 A1 | 10/2001 | Nachman et al. |
| 2001/0029464 A1 | 10/2001 | Schweitzwer |
| 2001/0032184 A1 | 10/2001 | Tenembaum |
| 2001/0047295 A1 | 11/2001 | Tenembaum |
| 2001/0051017 A1 | 12/2001 | Bissonette et al. |
| 2001/0054003 A1 | 12/2001 | Chien et al. |
| 2001/0054059 A1 | 12/2001 | Marks et al. |
| 2002/0002479 A1 | 1/2002 | Almog et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023108 A1 | 2/2002 | Daswani et al. |
| 2002/0029269 A1 | 3/2002 | McCarty et al. |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0069172 A1 | 6/2002 | Omshehe et al. |
| 2002/0077964 A1 | 6/2002 | Brody et al. |
| 2002/0077978 A1 | 6/2002 | O'Leary et al. |
| 2002/0087447 A1 | 7/2002 | McDonald et al. |
| 2002/0087471 A1 | 7/2002 | Ganesan et al. |
| 2002/0095443 A1 | 7/2002 | Kovack |
| 2002/0099826 A1 | 7/2002 | Summers et al. |
| 2002/0099936 A1 | 7/2002 | Kou et al. |
| 2002/0104006 A1 | 8/2002 | Boate et al. |
| 2002/0104017 A1 | 8/2002 | Stefan |
| 2002/0107788 A1 | 8/2002 | Cunnhingham |
| 2002/0143874 A1 | 10/2002 | Marquette et al. |
| 2002/0152163 A1 | 10/2002 | Bezos et al. |
| 2002/0156900 A1 | 10/2002 | Marquette et al. |
| 2002/0165949 A1 | 11/2002 | Na |
| 2002/0174010 A1 | 11/2002 | Rice, III |
| 2002/0178113 A1 | 11/2002 | Clifford et al. |
| 2002/0184507 A1 | 12/2002 | Makower et al. |
| 2002/0188869 A1 | 12/2002 | Patrick |
| 2002/0191548 A1 | 12/2002 | Ylonen et al. |
| 2002/0198806 A1 | 12/2002 | Blagg et al. |
| 2003/0001888 A1 | 1/2003 | Power |
| 2003/0018915 A1 | 1/2003 | Stoll |
| 2003/0023880 A1 | 1/2003 | Edwards et al. |
| 2003/0034388 A1 | 2/2003 | Routhenstein et al. |
| 2003/0037131 A1 | 2/2003 | Verma |
| 2003/0037142 A1 | 2/2003 | Munger et al. |
| 2003/0040995 A1 | 2/2003 | Daddario et al. |
| 2003/0041165 A1 | 2/2003 | Spencer et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0055871 A1 | 3/2003 | Roses |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |

(56) References Cited

U.S. PATENT DOCUMENTS

| | | |
|---|---|---|
| 2003/0084647 A1 | 5/2003 | Smith et al. |
| 2003/0088552 A1 | 5/2003 | Bennett et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0149594 A1 | 8/2003 | Beazley et al. |
| 2003/0154171 A1 | 8/2003 | Karp et al. |
| 2003/0154403 A1 | 8/2003 | Keinsley et al. |
| 2003/0159072 A1 | 8/2003 | Bellinger et al. |
| 2003/0163700 A1 | 8/2003 | Paatero |
| 2003/0163733 A1 | 8/2003 | Barriga-Caceres et al. |
| 2003/0167229 A1 | 9/2003 | Ludwig et al. |
| 2003/0177067 A1 | 9/2003 | Cowell et al. |
| 2003/0191549 A1 | 10/2003 | Otsuka et al. |
| 2003/0204460 A1 | 10/2003 | Robinson et al. |
| 2003/0225688 A1 | 12/2003 | Dobbins |
| 2004/0031856 A1 | 2/2004 | Atsmon et al. |
| 2004/0049702 A1 | 3/2004 | Subramaniam et al. |
| 2004/0117409 A1 | 6/2004 | Scahill et al. |
| 2004/0153378 A1 | 8/2004 | Perkowski |
| 2004/0215514 A1 | 10/2004 | Quinlan |
| 2004/0254991 A1 | 12/2004 | Malik et al. |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0091126 A1 | 4/2005 | Junger |
| 2005/0120180 A1 | 6/2005 | Schornbach et al. |
| 2005/0193056 A1 | 9/2005 | Schaefer et al. |
| 2005/0278641 A1 | 12/2005 | Mansour et al. |
| 2006/0029261 A1 | 2/2006 | Hoffman et al. |
| 2006/0116949 A1 | 6/2006 | Wehunt et al. |
| 2006/0274970 A1 | 12/2006 | Seki et al. |
| 2008/0034209 A1* | 2/2008 | Dickinson ............... H04L 63/08 713/168 |
| 2008/0098464 A1* | 4/2008 | Mizrah .................. G06F 21/36 726/5 |
| 2009/0177894 A1* | 7/2009 | Orsini ................ G06F 21/6209 713/193 |
| 2009/0254750 A1* | 10/2009 | Bono .................. H04L 63/0428 713/170 |
| 2010/0079243 A1* | 4/2010 | Hamada .................. G06F 21/32 340/5.83 |
| 2011/0142234 A1* | 6/2011 | Rogers .................... G06F 21/35 380/247 |
| 2012/0060214 A1* | 3/2012 | Nahari .................. G06F 21/316 726/19 |
| 2012/0303476 A1* | 11/2012 | Krzyzanowski .......... G06F 8/60 705/26.5 |
| 2013/0080780 A1* | 3/2013 | Mister .................... G06F 21/36 713/168 |
| 2014/0130127 A1* | 5/2014 | Toole ....................... G06F 21/60 726/3 |
| 2015/0128252 A1* | 5/2015 | Konami ................ H04L 63/107 726/17 |
| 2017/0048230 A1* | 2/2017 | Johansson ............... H04L 63/08 |

FOREIGN PATENT DOCUMENTS

| | | |
|---|---|---|
| EP | 855659 | 7/1998 |
| EP | 884877 | 12/1998 |
| EP | 917119 | 5/1999 |
| EP | 1014318 | 6/2000 |
| EP | 1022664 | 7/2000 |
| EP | 1056043 | 11/2000 |
| EP | 1089516 | 4/2001 |
| JP | 10187467 | 7/1998 |
| JP | 2003-24329 | 11/2000 |
| JP | 2001-134672 | 5/2001 |
| JP | 2005-242976 | 9/2005 |
| WO | 97/43736 | 11/1997 |
| WO | 99/40507 | 8/1999 |
| WO | 99/52051 | 10/1999 |
| WO | 00/68858 | 11/2000 |
| WO | 01/18656 | 3/2001 |
| WO | 01/35355 | 5/2001 |
| WO | 01/43084 | 6/2001 |
| WO | 01/88659 | 11/2001 |
| WO | 02/17082 | 2/2002 |
| WO | 2004/079603 | 9/2004 |

OTHER PUBLICATIONS

Amy Cortese et al, Cyberspace: Crafting software that will let you build a business out there, Bus. Week, Feb. 27, 1995, at 78.

Amy K. Larsen, Internet Goes to Work for Builders, InternetWeek, Nov. 16, 1998, at 26.

Anne Knowles, Improved Internet security enabling on-line commerce, PC Week, Mar. 20, 1995.

Anne Thomas, Sun Microsystems, Enterprise Javabeans Technology, http://java.sun.com (last visited May 21, 1999).

Associates National Bank (Delaware), Our Cards, http://www.theassociates.com (last visited Apr. 6, 1999).

Aversion Therapy: Banks overcoming fear of the Net to develop safe Internet-based payment system with Netscape Communicator, Network World, Dec. 12, 1994.

Barry D. Bowen, Sun Microsystems, Banking on JAVA Technology, http://java.sun.com (last visited May 21, 1999).

Bechtel Construction Operations Incorporated Standardizes on Primavera's Expedition Contract Management Software, Bus. Wire, Jul. 27, 1999.

Calyx Software, POINT for Windows Version 3.x Interface Marketing Guide (Dec. 8, 1999).

David Bank, Cash, Check, Charge—what's next? Seattle Times, Mar. 6, 1995, at D-1.

David D. Owen, Facilities Planning and Relocation 108, 110, 112-114, 117-127, 137-138, 199-217, 241, 359 (R.S. Means Company, Inc. 1993).

David G. Cotts, The Facility Management Handbook 135-40 (2d ed. 1998).

David P. Kormann et al, Risks of the Passport Single Signon Protocol, 33 Computer Networks 51-58 (2000).

David Post, E-Cash: Can't Live With It, Can't Live Without It, Am. Lawyer, Mar. 1995, at 116.

Dominique Deckmyn, San Francisco Manages $45M Project Via Web-Based Service, ComputerWorld, Aug. 9, 1999, at 14.

Don Clark, Microsoft, Visa to Jointly Develop PC Electronic-Shopping Software, Wall St. J., Nov. 9, 1994, at B9.

eCharge Corporation, http://www.echarge.com/company/index.htm (last visited Dec. 3, 1999).

FreeMarkets Online, Inc., http://www.freemarkets.com (last visited Apr. 1999).

G&D America's Multi-application Smart Card Selected for Combined Payroll and 'Virtual Banking' Program in Mexico, Bus. Wire, Apr. 24, 1998.

GE TPN Post Service Use Guidelines, Getting Started (Apr. 26, 1999).

GE TPN Post Service Use Guidelines, Resource Center (Apr. 26, 1999).

Gerry Vandenengel, Cards on the Internet: Advertising on a $3 Bill, World Card Tech., Feb. 1995, at 46.

Harris InfoSource, http://www.harrisinfo.com (last visited Apr. 26, 1999).

Hewlett-Packard Co., Understanding Product Data Management (Apr. 26, 1999).

Jeffrey Kutler, A different drummer on the data highway, Am. Banker, May 12, 1995, at 14.

Jeffrey Kutler, Cash Card Creator Looking Beyond Mondex, Am. Banker, Feb. 9, 1995, at 16.

John N. Frank, Beyond direct mail, Credit Card Mgmt., Aug. 1996, at 54.

Jonathan Berry et al, Database: A Potent New Tool for Selling, Bus. Week, Sep. 5, 1994, at 56.

Karen Epper, A player goes after big bucks in cyberspace, Am. Banker, May 5, 1995, at 17.

Keith Brown, The Builder's Revolution, BuildNet Publishing (1996).

(56) References Cited

OTHER PUBLICATIONS

Kennedy Maiz, Fannie Mae on the Web, Newsbyte, May 8, 1995.
Kim A. Strassel, Dutch Software Concern Experiments with Electronic 'Cash' in Cyberspace, Wall St. J., Apr. 17, 1995, at B6.
Ko Fujimura et al, A World Wide Supermarket Scheme Using Rights Trading System, Proc 7th Int'l Conf. on Parallel and Distributed Systems: Workshops, pp. 289-294 (Jul. 2000).
Ko Fujimura et al, XML Voucher: Generic Voucher Language, Internet Engineering Task Force, http://www.
Lester D. Taylor, Telecommunications Demand Analysis in Transition, IEEE Proc. 31st Int'l Conf. on System Sciences, pp. 409-415 (1998).
Lynda Radosevich, Is workflow working?, CNN.com (Apr. 6, 1999), http://www.cnn.com/TECH/computing/9904/06/workflow.ent idg.
M. Alshawi et al, An IFC Web-Based Collaborative Construction Computer Environment: Wisper, Proc. Int'l Conf. Construction IT (1999).
Markus Jakobsson et al, Secure and lightweight advertising on the Web, 31 Computer Networks 1101-1109 (1999).
Marvin Sirbu et al, NetBill: An Internet Commerce System Optimized for Network Delivered Services, IEEE Personal Comm., pp. 34-39 (Aug. 1995).
Mary C. Lacity et al, The Information Systems Outsourcing Bandwagon, 35 Sloan Mgmt. Rev. 73 (1993).
Method of Protecting Data on a Personal Computer, IBM Technical Disclosure Bulletin 26:6, p. 2530 (Nov. 1935).
Muse Technologies, Inc., http://www.musetechnologies.com (last visited Apr. 26, 1999).
Nelson E. Hastings et al, A Case Study of Authenticated and Secure File Transfer: The Iowa Campaign Finance Reporting System (ICFRS) Performance, Computing and Comm. Conf., pp. 532-538 (Feb. 1997).
Object Management Group, CORBA for Beginners, http://www.omg.org (last visited May 25, 1999).
Object Management Group, CORBA Overview, http://pent21.infosys.tuwein.ac.at (last visited May 25, 1999).
Object Management Group, Library, http://www.omg.org (last visited May 25, 1999).
Object Management Group, What is CORBA?, http://www.omg.org (last visited May 25, 1999).
Omware, Inc., http://web.archive.org/web/20000226033405/www.omware.com/products.html (last visited Nov. 28, 2005).
Paul Seibert, Facilities Planning & Design for Financial Institutions 15, 272, 274-77 (1996).
Philip Carden, The New Face of Single Sign-On, Network Computing (Mar. 22, 1999), http://www.networkcomputing.com/1006/1006f1.html.
Primavera Systems Delivers Expedition Express, Bus. Wire, Feb. 23, 1999.
Primavera Systems, Inc., Expedition Contract Control Software Version 6.0 User's Guide (1998).
Primavera Systems, Inc., http://www.primavera.com (1999).
Primavera Systems, Inc., Primavera and PurchasePro.com to Create E-Commerce Marketplace for Construction Industry, Sep. 21, 1999, available at http://web.archive.org/web/2000412175935/http://www.purchasepro.com (last visited Jun. 23. 2005).
Product Data Integration Technologies, Inc., http://www.pdit.com (last visited Apr. 26, 1999).
Richard Mitchell, Netlink Goes After an Unbanked Niche, Card Tech., Sep. 1999, at 22.

Robert Barnham, Network brings together producers and companies, Feb. 1, 1994, at 80.
Roberta Fusaro, Builders moving to Web tools, ComputerWorld, Nov. 16, 1998, at 51.
Robyn Meredith, Internet bank moves closer to virtual reality, USA Today, May 5, 1995, at B1.
Safe Single-Sign-On Protocol with Minimal Password Exposure No-Decryption, and Technology-Adaptivity, IBM Technical Disclosure Bulleting 38:3, pp. 245-248 (Mar. 1995).
Server/Applet/HTML Authentication Process with Single Sign-On, IBM Research Disclosure 429128, pp. 163-165 (Jan. 2000).
Shimon-Craig Van Collie, Construction Loan Tool from PriMerit, New Trend, Bank Mgmt., Apr. 1990, at 60.
Siebel Systems, Inc., http://www.siebel.com (last visited Nov. 17, 1999).
SmartAxis bv, http://www.smartaxis.co.uk/seller/howitworks.html (last visited Feb. 23, 2001).
Steven Marlin, Chasing document management, Inform, pp. 76-82 (Apr. 1999).
Stuart J. Johnston, Pondering Passport: Do you trust microsoft with you data?, PC World, Sep. 24, 2001.
Sun Microsystems, Applets, http://java.sun.com (last visited May 21, 1999).
Sun Microsystems, JAVA Remote Method Invocation Interface, http://java.sun.com (last visited May 21, 1999).
Sun Microsystems, JAVA Servlet API, http://java.sun.com (last visited May 21, 1999).
Sun Microsystems, JAVA Technology in the Real World, http://java.sun.com (last visited May 21, 1999).
Sun Microsystems, JNDI Overview, http://java.sun.com (last visited May 21, 1999).
Sun Microsystems, Staying in Touch with JNDI, http://java.sun.com (last visited May 21, 1999).
Sun Microsystems, The JDBC Data Access API, http://java.sun.com (last visited May 21, 1999).
Temporary Global Passwords, IBM Technical Disclosure Bulletin 26:3, pp. 451-453 (Mar. 1993).
The check is in the E-mail, Info. Today, Mar. 1, 1995, at 43.
ThomasNet, Inc., http://www.thomasnet.com (last visited Apr. 26, 1999).
ThomasNet, Inc., SoluSource for Engineers by Engineers, http://www.solusource.com (last visited Apr. 26, 1999).
Timothy M. Chester, Cross-Platform Integration with XML and SOAP, IP Pro, pp. 26-34 (Sep./Oct. 2001).
Tom Jepsen, SOAP Cleans up Interoperability Problems on the Web, IT Pro, pp. 52-55 (Jan./Feb. 2001).
Tomas Hernandez Jr., Software Solutions, Building Design & Construction, Nov. 1999, at 38.
U.S. Small Business Administration, PRO-Net, www.sba.gov (last visited Jun. 8, 1999).
V. Ryan et al, Internet Engineering Task Force, Schema for Representing CORBA Objects in an LDAP Directory (work in progress), http://tools.ietf.org/html/draft-ryan-corba-schema-00 (Apr. 15, 1999).
Vanessa Houlder, OFT gives the individual top priority, Fin. Times, Jun. 8, 1994.
VISA International, Consortium Created to Manage Common Electronic Purse Specifications, http://www.visa.com/av/news/PRmisc051199.vhtml (last visited Feb. 23, 2001).
W. Richard Mosig Jr., Software Review: The Construction Project Manager, Cost Engineering, Jan. 1996, at 7.
Wingspan Bank, At Your Request, http://www.wingspanbank.com (last visited Aug. 10, 1999).

\* cited by examiner

CONFIDENCE-BASED AUTHENTICATION

RELATED APPLICATIONS

This application claims priority to Provisional Application No. 61/798,178 filed Mar. 15, 2013, and is a continuation application of U.S. patent application Ser. No. 14/216,315 filed on Mar. 17, 2014, which is hereby incorporated in its entirety.

TECHNICAL FIELD

The invention relates generally to user authentication and, more specifically, to a multi-level approach for authenticating a user.

BACKGROUND

In a traditional approach to authentication, a user must provide all required elements with perfect accuracy to be authenticated and permitted access. For example, a user who provides a correct pin or password may be granted access to a computer system. Otherwise, when all required elements of an authentication method are not met, an authentication attempt fails and a user is denied access.

The foregoing authentication approach can be frustrating to a user who, for example, accidentally mistypes a character on a mobile device or forgets to enter a portion of a password in the correct format (e.g., case-sensitive characters). In addition, other forms of authentication methods, such as voice recognition, retinal scanning, facial recognition, and fingerprint scanning have varying levels of matching, which do not fit within the current "all or nothing" authentication paradigm. Further, traditional authentication methods can be exploited by unauthorized parties who, for example, may capture a single piece of authentication information gain access to an entire system.

Accordingly, there is a need for a more flexible approach to authentication that may take into consideration the risk level associated with a particular activity and various forms of known or ascertainable behavioral information associated with a user.

SUMMARY OF THE INVENTION

The proposed invention is directed to providing a sliding scale of authentication strength that may be based on a risk-level associated with a requested activity relating to service requiring user authentication. An authentication rating may be defined for an activity to indicate a minimum authentication rating that is required to all a user to perform the activity. For example, a required authentication rating may be set at a moderately high level for a banking account balance check, while a required authentication rating may be set at a significantly higher level for an international wire transfer involving a large amount of funds.

An authentication rating may also be determined for each user by combining one or more authentication elements that are known about or provided by a user. Various authentication elements, such as, behavioral information, location, user-supplied credentials, biometrics and device authentication, may be combined to determine a user authentication rating. For example, a rating value having a 98% accurate fingerprint scan can be combined with a rating value having a 90% accurate user supplied password to calculate an authentication rating for a user at a single point in time.

A user's authentication rating may be dynamically adjusted within or outside of an active user session as new information is learned about or provided by the user. For example, a user's authentication rating may be increased if it is determined the user is in a known location (e.g., home), or if the user is using or calling from a known or registered device. A user's authentication rating also may be decreased, for example, if a transaction is attempted from an unusual location for the user, such as another country. Authentication ratings also may be dynamically adjusted, for example, based on information provide at various times from other sources, such as fraud monitoring and detection systems.

The process of authentication may be performed by comparing a user's current authentication rating with the required authentication rating needed to perform an activity. A user may be allowed to proceed with performing the activity when the user's current authentication rating meets or exceeds the required authentication rating for the activity. A user also may be asked to provide additional information even when the user's current authentication rating exceeds requirements, for example, to supply an additional authentication element required for a specific activity. A user may be denied access from areas of a system or from performing an activity when the user's current authentication rating does not meet a required authentication rating. When denied access, the user may be given an opportunity to provide one or more additional authentication elements to increase the user's authentication rating to a level deemed acceptable for granting access.

In some embodiments, a user may be authenticated "silently" based on who they are or who they appear to be. Silent authentication may occur, for example, when a user attempts to perform a lower-risk transaction, which the user has performed behaviorally at the same time and from the same place at regular intervals in the past. In other embodiments, silent authentication may be performed to augment what a user has provided in a secure way. For example, a user may mistype a single character in a password, but if they are on a known device in a known location, then the user may be allowed to proceed without any further interruption.

In view of the foregoing, the proposed invention may improve the ease of authentication for users, increase the overall security of systems, and allow rapid incorporation of emerging authentication technologies.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
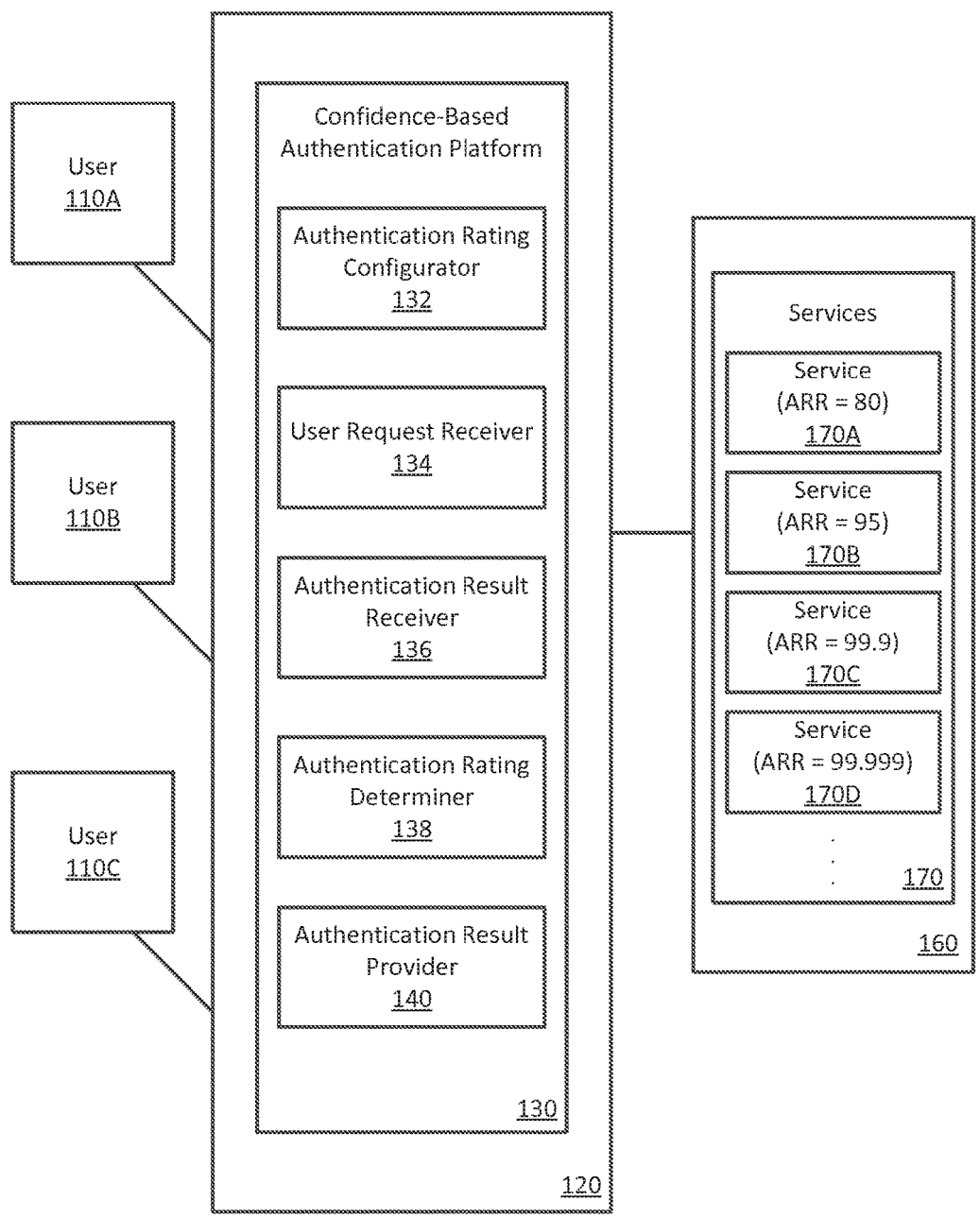
FIG. 1 illustrates a system block diagram of a confidence-based authentication platform, in accordance with various embodiments of the present invention.

In the following description, numerous details are set forth. It will be apparent, however, to one skilled in the art having the benefit of this disclosure, that the present invention may be practiced without these specific details. In some instances, well-known structures and devices are shown in block diagram form, rather than in detail, in order to avoid obscuring the present invention.

Some portions of the detailed descriptions may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "assigning", "receiving", "determining", "associating", "providing", "updating", "transmitting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention may also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays that may be presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the following description. In addition, the present invention is not described with reference to any particular programming language. It will be appreciated that a variety of programming languages may be used to implement the teachings of the invention as described herein.

FIG. 1 illustrates a block diagram of a system 100, in accordance with various embodiments of the present invention. System 100 may be comprised of one or more computer systems connected by one or more networks. The networks may be, for example, public networks (e.g., the Internet), private networks (e.g., a local area networks (LAN) or wide area networks (WAN)), or a combination thereof. The computer systems may include personal computers (PC), laptops, mobile phones, tablet computers, or any other computing device. The computer systems may run an operating system (OS) that manages hardware and software. The computer systems also may include one or more server machines. A server machine may be a rackmount server, a router computer, a personal computer, a portable digital assistant, a mobile phone, a laptop computer, a tablet computer, a camera, a video camera, a netbook, a desktop computer, a media center, or any combination thereof. System 100 also may include one or more persistent data stores, such as a file server or network storage, capable of storing various types of data. In some embodiments, the data store might include one or more other types of persistent storage such as an object-oriented database, a relational database, and so forth.

Referring to the block diagram illustrated in FIG. 1, system 100 may be comprised of a plurality of users 110A-110C, a server 120, a confidence-based authentication platform 130, a server 160, and a plurality of services 170. In one embodiment, users 110A-110C may be a person or some type of representative entity using a software application on a computing device to access information or to perform actions on one or more computing systems. In another embodiment, users 110A-110C may also be computer systems configured to perform activities, which are not directly controlled by an actual person or representative entity. In this particular embodiment, an assessment may be made whether the computer systems configured to perform activities should be trusted to allow for authentication of the actual person or representative entity they are acting on behalf of.

Server 120 may be configured with confidence-based authentication platform 130. Server 120 may include one or more applications or systems that may or may not utilize confidence-based authentication platform 130. Server 120 may facilitate confidence-based authentication by providing confidence-based authentication services to one or more computing devices associated with users. For example, server 120 may receive and process authentication requests received at remote systems via a direct call, an API or any other applicable communication interface. Confidence-based authentication platform 130 may be comprised of one or more components including, but not limited to, an authentication rating configurator 132, a user request receiver 134, an authentication result receiver 136, an authentication rating determiner 138 and an authentication result provider 140.

Authentication rating configurator 132 may be configured to assign an authentication requirement rating to an activity that may be performed on one or more computing systems. Authentication rating configurator 132 also may be configured to assign an authentication capability rating to authentication methods (e.g., pin, password, retinal scan, fingerprint scan, etc.).

User request receiver 134 may be configured to receive authentication requests from users 110A-110C attempting to gain access to one or more computing systems for performing one or more activities. User request receiver 134 also may be configured to receive requests to perform user authentication on behalf of one or more computing systems.

Authentication result receiver 136 may be configured to receive the results relating to authentication of a user. For example, authentication result receiver 136 may receive results relating to how many characters/numerals of a password match. Authentication result receiver 136 also may be configured to receive match results of a biometric scan (e.g., a retinal scan or a fingerprint scan).

Authentication rating determiner 138 may be configured to determine a current authentication rating for a user based on one or more authentication methods and their corresponding results. Authentication rating determiner 138 also may be configured to combine results of two or more authentication methods performed over time. Authentication methods may include, but are not limited to, PINs, passwords, guided passwords, facial recognition, dynamic facial recognition, interactive facial recognition, voice recognition, tokens, dynamic tokens, location or any other applicable authentication method employed by a system for granting access to a user.

Authentication result provider 140 may be configured to provide a result of authentication performed in response to a user request. For example, authentication result provider 140 may return an authentication result to a requesting computing system. Authentication result provider 140 also may be configured to forward an authentication result to one or more different systems.

Server 160 may be configured with a plurality of services 170. Server 160 may include one or more applications or systems that may or may not utilize the plurality of services 170. In one embodiment, servers 120 and 160 may exist on the same computing device or each may reside on one or more of their own computing devices. Server 160 may facilitate the plurality of services 170 made available to users 110A-110C. Service 170A may represent, for example, a user's ability to view balance data on a banking or financial system. Service 170B may represent, for example, a user's ability to view transactional data on a banking or financial system. Service 170C may represent, for example, a user's ability to view wire funds data on a banking or financial system. Service 170D may represent, for example, a user's ability to request a new wire on a banking or financial system. Each of services 170A-170D may be assigned an authentication requirement rating (ARR). For example, an ARR of 80, 95, 99.9 and 99.999 may be assigned, respectively, to services 170A, 170B, 170C and 170D. The authentication requirement rating is described further with reference to the confidence-based authentication method 200 of FIG. 2.

Figure 2:
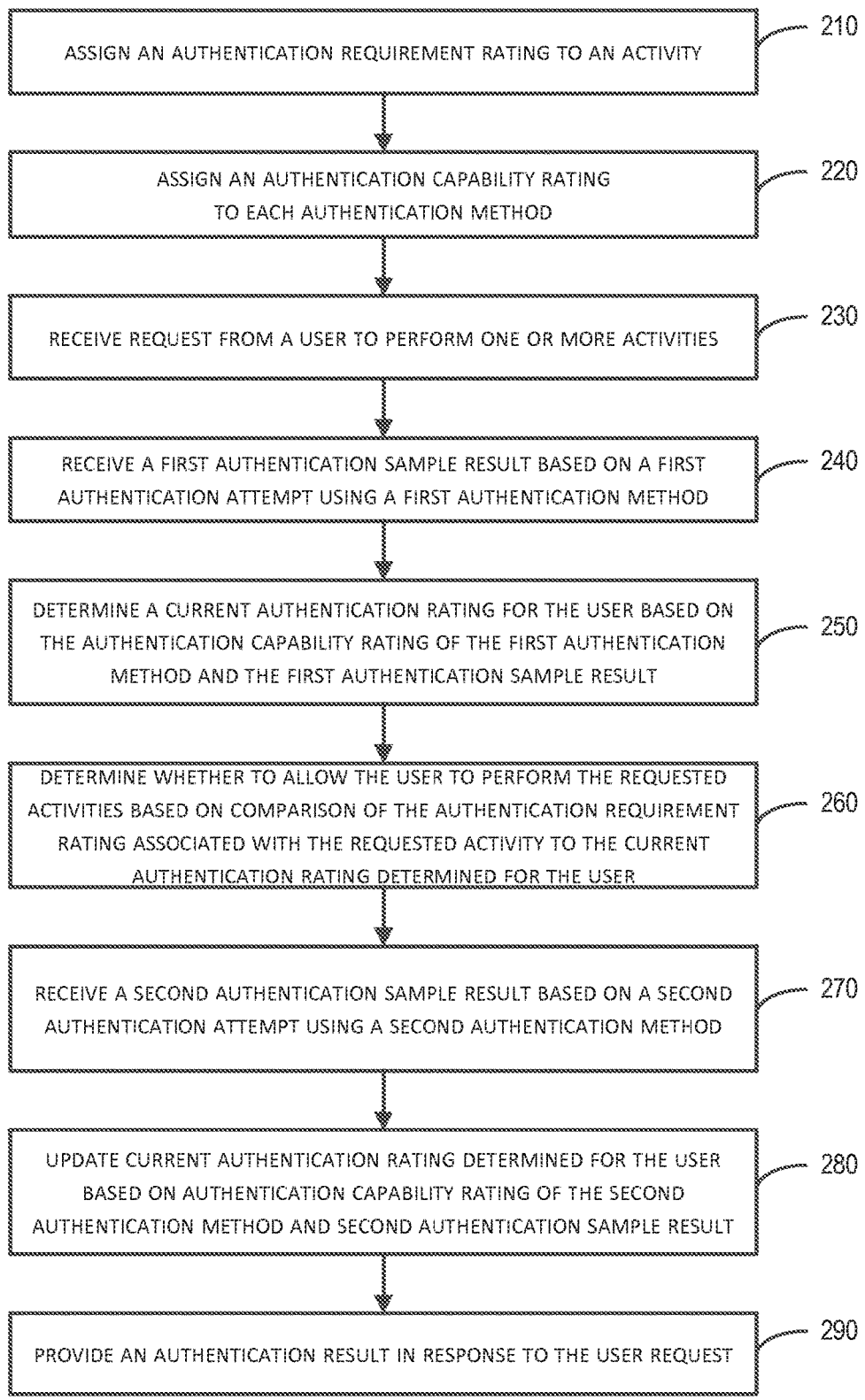
FIG. 2 is a process flow diagram illustrating a method of confidence-based authentication, according to an embodiment of the present invention.

FIG. 2 is a process flow diagram illustrating a method 200 for confidence-based authentication, according to an embodiment of the present invention. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 200 may be performed by one or more components of confidence-based authentication platform 130 of FIG. 1.

At stage 210, an authentication requirement rating may be assigned to an activity (e.g., relating to the plurality of services 170 of FIG. 1). In one embodiment, stage 210 may be performed by authentication rating configurator 132. An authentication requirement rating sets the authentication level necessary before a certain action can be performed in connection with an activity. The authentication requirement rating for an activity is value based and, thus, may be determined independent of any technology used for authentication purposes. The authentication requirement rating may also exist independently of any application or computing environment to allow it to be applied to a variety of different applications/environments. Further, the authentication requirement rating may be predefined by one or more of legal, compliance, privacy, business, and stakeholder entities. Once an authentication requirement rating is assigned, a user's authentication rating may be compared to the authentication requirement rating to determine whether or not the user may be permitted to perform the desired activity.

Activities may be assigned an authentication rating (e.g., value, percentage, etc.) that represents a required level of authentication needed for a user to perform the activity. An activity may include performing one or more steps involving gaining access to existing data, creating new data, viewing data, updating/modifying data, deleting data or any combination thereof. Authentication requirement ratings may also be assigned to various levels of data access on a system. Example activities (and assigned authentication ratings) may include, but are not limited to, viewing a balance (99%), viewing account information (99%), viewing a corporate phonebook (99.9%), adding a payee (99.999%), performing a small wire transfer (99.999%), performing a large wire transfer (99.9999%), viewing a production system status (99.9%), updating a production system (99.999%) or any other applicable activity requiring a user to be authenticated.

At stage 220, an authentication capability rating is assigned to each of one or more authentication methods. In one embodiment, stage 220 may be performed by authentication rating configurator 132. The authentication capability rating represents the ability of an authentication technology (method) to authenticate a user. Each authentication technology (password, rotating token, facial recognition, etc.) will have a limit in its ability to authenticate a user and, even if the technology employed by the user yields a 100% match, there is a reduced confidence based on that limit. Therefore, the authentication capability rating may represent the maximum authentication level that a specific authentication method can provide. The authentication capability rating defined for an authentication method may be adjusted higher or lower at any time based on past experience with the authentication method or protection level that the authentication method is known to provide. Authentication methods (and assigned capability ratings) may include, for example, a four digit pin (90%), a device ID (99%), geolocation (99%), a physical card (99%), facial recognition (99.9%), password (99.99%), RSA token (99.999%) or any other known authentication methods.

At stage 230, a request may be received from a user to perform an activity associated with one or more computer systems. In one embodiment, stage 230 may be performed by user requests receiver 134. A user may request to perform a specific action associated with one or more applications or systems.

At stage 240, a first authentication sample result may be received based on a first authentication attempt a user performs using a first authentication method. In one embodiment, stage 240 may be performed by authentication result receiver 136. An authentication challenge may be presented to the user in response to receiving a user request at stage 230. Authentication challenges may include, for example, information relating to a multi-digit pin, a physical card, a card number, an account number, geolocation, a device identifier, facial recognition, voice recognition, fingerprint recognition, password, image recognition, a token or any other challenge presentable to a user for purposes of authentication.

In the traditional context of passwords, an authentication sample result is either 100% or 0% (i.e., either the user password is or is not an exact match). However, more flexible approaches are utilized in the present invention. For example, a password entered by a user on a mobile device may be off by one or more characters. Instead of rejecting the user's authentication attempt, an analysis may be performed to determine how closely the entered password matches the correct password. Then an authentication sample result may be calculated for the authentication attempt based on how close the entered password matches the correct password (e.g., 80%, 90%, etc.). Thus, a variable level of value may be determined based on how closely a user's authentication attempt matches the expected/correct result. Such determinations may be evaluated individually and/or combined with determinations made for other authentication attempts performed by the same user. For example, a partial password match may be combined with voice and/or facial recognition of a user, which also each may be partial matches (e.g., 95% and 99% respectively).

At stage 250, a current authentication rating for the user may be determined based on the authentication capability rating of the first authentication method and the first authentication sample result. In one embodiment, stage 250 may be performed by authentication rating determiner 138. A current authentication rating may be the level at which a user has been authenticated based on one or more authentication methods. A user's authentication rating may be dynamic in the sense that it may be adjusted upward or downward as more information is obtained about the user.

A current authentication rating may be identified as a percentage (e.g., 90%, 95%, 99.9%, 99.999%) and may represent a level of confidence that the user is who they purport to be. The current authentication rating may be determined based on the result of a single authentication method or by combining a plurality of authentication results from one or more authentication methods. In one embodiment, for example, the current authentication rating (CAR) may be calculated as a value yielded by the product of an authentication capability rating (ACR) and an authentication sample result (ASR)—i.e., CAR=ACR*ASR.

At stage 260, a determination may be made whether) allow the user to perform the requested activity based on a comparison of the authentication requirement rating associated with the requested activity to the current authentication rating for the user. In one embodiment, stage 260 may be performed by authentication result provider 140. When the user's current authentication rating is equal to or exceeds the authentication requirement rating for the requested activity, then the user may be authenticated and permitted to perform that activity. When the user's current authentication rating does not equal or exceed the authentication requirement rating for the requested activity, then the user may be denied from performing that activity. When the user is denied from performing the activity, the user may be presented with additional methods of authentication to improve the user's current authentication rating.

At stage 270, a second authentication sample result may be received based on a second authentication attempt the user performs using a second authentication method. In one embodiment, stage 270 may be performed by authentication result receiver 136. A second authentication sample result may be used to improve a current authentication rating for a user. Also, a second authentication sample may be required when a user attempts to perform one or more activities having authentication requirement ratings that exceed the user's current authentication rating. The second authentication method may be the same as the first authentication method or may be a different method of authentication.

At stage 280, the current authentication rating determined for the user is updated based on the authentication capability rating of the second authentication method and the second authentication sample result. In one embodiment, stage 280 may be performed by authentication rating determiner 138. The authentication capability rating of the second authentication method and the second authentication sample result may be combined with the user's existing current authentication rating to produce an updated (new) current authentication rating for the user. In one embodiment, for example, a new current authentication rating ($CAR_{new}$) may be calculated using the previous (old) current authentication rating ($CAR_{old}$) as follows: $CAR_{new}=CAR_{old}+(100-CAR_{old})*(ACR*ASR)$, wherein the value of 100 reflects perfect confidence in a user's identity.

In another embodiment, rather than determine an authentication rating based on multiple authentication sample results received from one or more authentication methods, a first authentication method may be "silent" meaning that user is authenticated based on information that is already known or can be ascertained about the user. In this embodiment, the first authentication sample result may be based on how closely the information known about the user matches expected, correct or predicted information (e.g., information learned about the user from previous interactions such as registrations, transactions, etc.).

Similarly, a determination may be made regarding whether to allow the user to perform the requested activity based on comparing the authentication requirement rating associated with the requested activity to the current authentication rating determined for the user. However, in this embodiment, information known about the user may be used to automatically authenticate the user without an explicit authentication challenge. For example, when a user calls on a cell phone that has been registered to a user account then that information can be used to influence the user's current authentication rating. Other influencing factors may include the computing device that the user is using, a network the user originates from, user behavior observed in the current user session, user behavior observed in past user sessions or any other applicable factor.

The current authentication rating for a user may be adjusted based on one or more factors known or determined about the user without relying on multiple authentication methods and corresponding authentication results. The current authentication rating for a user may be adjusted upward or downward based solely on factors known or determined about the user. The current authentication rating for a user may increase when a user performs a transaction in a trusted location (e.g., the user's home), uses a known or trusted device for performing the transaction, or performs the same activity or series of activities at a regular time. The user's current authentication rating for a user may be decreased when the user performs a transaction in another location (e.g., another state, another country, etc.), at an unusual time or other applicable criteria based on the user's historical behavior. Any information that is known or can be determined about the user or the user's patterns of behavior may be used to adjust the current authentication rating accordingly.

At stage 290, an authentication result is provided in response to the user request. In one embodiment, stage 290 may be performed by authentication result provider 140. The authentication result may comprise granting a user's request to perform an activity, rejecting a user's request to perform an activity, returning an indication of the authentication result to one or more systems or generating one or more alerts and/or system updates. One or more updates may be generated when the authentication result is provided, for example, to update historical information learned about a user.

Figure 3:
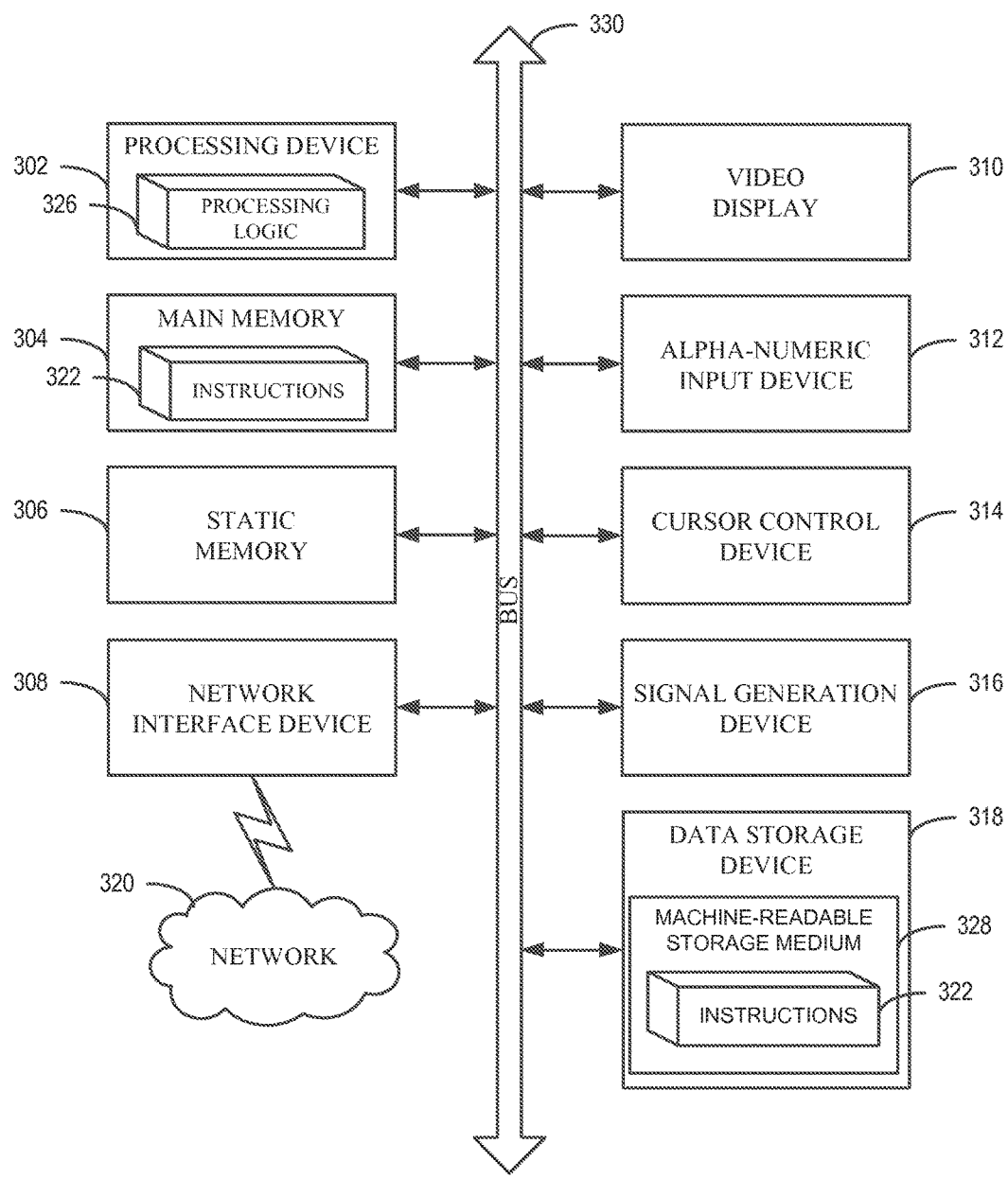
FIG. 3 is a block diagram of an exemplary computer system that may perform one or more of the operations described herein.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing device (processor) 302, a main memory 304 (e.g., read-only memory (ROM), flash memory, dynamic random access memory (DRAM) such as synchronous DRAM (SDRAM), double data rate (DDR SDRAM), or DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, central processing unit, or the like. More particularly, processing device 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute processing logic 326 for performing the operations and steps discussed herein.

Computer system 300 may further include a network interface device 308. Computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

Data storage device 318 may include a machine-readable storage medium (or more specifically a computer-readable storage medium) 328 on which is stored one or more sets of instructions 322 (e.g., software) embodying any one or more of the methodologies or functions described herein. Instructions 322 may also reside, completely or at least partially, within main memory 304 and/or within processing device 302 during execution thereof by computer system 300, main memory 304 and processing device 302 also constituting computer-readable storage media. Instructions may further be transmitted or received over a network 320 via network interface device 308.

While machine-readable storage medium 328 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of it s ructions for execution by the machine and that cause the machine to perform any one or more of the methodologies of the present invention. The term "machine-readable storage medium" shall accordingly be taken to include, but not be limited to, solid-state memories, optical media, and magnetic media.

It is to be understood that the foregoing description is intended to be illustrative, and not restrictive. Many other embodiments will be apparent to those of skill in the art upon reading and understanding the foregoing description. The scope of the present invention should therefore be determined with reference to the appended claims, along with the full scope of equivalents to which such claims are entitled.

What is claimed is:

1. A computer-implemented method, comprising:
assigning by a programmed computer, an authentication requirement rating to an activity, the authentication requirement rating being a value associated with the activity and independent of authentication technology used to perform authentication;
assigning, by the programmed computer, an authentication capability rating to each of one or more authentication methods, wherein the authentication capability rating indicates a maximum authentication level that each authentication method can provide;
receiving, at the programmed computer, over a network from a remote user access device, a request from a user to perform the activity;
formulating, in response to the request, an authentication challenge requiring a first authentication method for presentation to the user, wherein the first authentication method comprises at least an alphanumeric input;
receiving, at the programmed computer over the network from the remote user access device, an alphanumeric input attempt from the user;
calculating a first authentication sample result as a degree of similarity between the alphanumeric input attempt and an expected alphanumeric input result;
determining, by the programmed computer, a current authentication rating for the user based on the authentication capability rating of the first authentication method and the first authentication sample result, wherein the current authentication rating is a product of the authentication capability rating and the authentication sample result; and
determining, by the programmed computer, whether to allow the user to perform the requested activity based on a comparison of the authentication requirement rating associated with the activity requested by the user and the current authentication rating determined for the user wherein the requested activity is permitted when the current authentication rating is greater than or equal to the authentication requirement rating for the activity;
wherein when the current authentication rating is less than the requirement rating for the activity, the processing device accessing the memory and executing instructions performs additional steps including:

denying the requested activity;

providing the user with a second authentication challenge;

receiving a second authentication attempt in response to the second authentication challenge and calculating a second sample result, wherein the second sample result is calculated as a degree of similarity between the second authentication attempt and a second expected authentication result; and adjusting the current authentication rating determined for the user based on the second authentication sample result.

2. The method of claim 1, wherein the current authentication rating is dynamically adjusted based on information received about the user.

3. The method of claim 2, wherein the current authentication rating is adjusted based on user patterns of behavior without requiring additional authentication methods.

4. The method of claim 1, further comprising denying user access when the current authentication rating is less than the authentication requirement rating for the requested activity.

5. The method of claim 4, further comprising providing the user with a second authentication challenge when user access is denied.

6. The method of claim 5, further comprising receiving an authentication attempt in response to the second authentication challenge and calculating a second sample result based on the authentication attempt.

7. The method of claim 6, further comprising adjusting, by the programmed computer, the current authentication rating determined for the user based on the second sample result.

8. The method of claim 7, wherein the second authentication method is a silent authentication method utilizing one or more factors determined about the user without presenting an explicit authentication challenge to the user.

9. The method of claim 7, further comprising adjusting the current authentication rating by combining the second authentication result with an authentication capability rating of the second authentication method and the current authentication rating to arrive at a new current authentication rating.

10. The method of claim 7, further comprising providing a final authentication result by the programmed computer over the network to the remote user access device.

11. A computer system, comprising:

a memory; and a processing device communicatively coupled to the memory, the processing device accessing the memory and executing instructions to perform steps including:

assigning an authentication requirement rating to an activity, the authentication requirement rating being a value associated with the activity and independent of authentication technology used to perform authentication;

assigning an authentication capability rating to each of one or more authentication methods, wherein the authentication capability rating indicates a maximum authentication level that each authentication method can provide;

receiving over a network from a remote user access device, a request from a user to perform the activity;

formulating, in response to the request, an authentication challenge requiring a first authentication method for presentation to the user;

receiving over the network from the remote user access device, an authentication attempt from the user;

calculating a first authentication sample result as a degree of similarity correspondence between the authentication attempt and an expected authentication result;

determining a current authentication rating for the user based on the authentication capability rating of the first authentication method and the first authentication sample result, wherein the current authentication rating is a product of the authentication capability rating and the authentication sample result;

determining whether to allow the user to perform the requested activity based on a comparison of the authentication requirement rating associated with the activity requested by the user and the current authentication rating determined for the user;

wherein the requested activity is permitted when the current authentication rating is greater than or equal to the authentication requirement rating for the activity;

wherein when the current authentication rating is less than the requirement rating for the activity, the processing device accessing the memory and executing instructions performs additional steps including:

denying the requested activity;

providing the user with a second authentication challenge;

receiving a second authentication attempt in response to the second authentication challenge and calculating a second sample result, wherein the second sample result is calculated as a degree of similarity between the second authentication attempt and a second expected authentication result; and adjusting the current authentication rating determined for the user based on the second authentication sample result.

12. The system of claim 11, wherein the current authentication rating is dynamically adjusted based on information received about the user.

13. The system of claim 11, wherein the second authentication method is a silent authentication method utilizing one or more factors determined about the user without presenting an explicit authentication challenge to the user.

14. The system of claim 11, wherein the current authentication rating is adjusted based on user patterns of behavior without requiring additional authentication methods.

15. The system of claim 11, further comprising providing a final authentication result by the programmed computer over the network to the remote user access device.

16. A non-transitory computer readable storage medium including instructions that, when executed by a processing device, cause the processing device to perform a method, said method comprising:

assigning an authentication requirement rating to an activity, the authentication requirement rating being a value associated with the activity and independent of authentication technology used to perform authentication;

assigning an authentication capability rating to each of one or more authentication methods, wherein the authentication capability rating indicates a maximum authentication level that each authentication method can provide;

receiving over a network from a remote user access device, a request from a user to perform the activity;

formulating, in response to the request, an authentication challenge requiring a first authentication method for presentation to the user;

receiving over the network from the remote user access device, an authentication attempt from the user;

calculating a first authentication sample result as a degree of similarity between the authentication attempt and an expected authentication result;

determining a current authentication rating for the user based on the authentication capability rating of the first authentication method and the first authentication sample result, wherein the current authentication rating is a product of the authentication capability rating and the authentication sample result;

determining whether to allow the user to perform the requested activity based on a comparison of the authentication requirement rating associated with the activity requested by the user and the current authentication rating determined for the user;

wherein the requested activity is permitted when the current authentication rating is greater than or equal to the authentication requirement rating for the activity;

wherein when the current authentication rating is less than the requirement rating for the activity, the method further comprises:

denying the requested activity;

providing the user with a second authentication challenge;

receiving a second authentication attempt in response to the second authentication challenge and calculating a second sample result, wherein the second sample result is calculated as a degree of similarity between the second authentication attempt and a second expected authentication result; and adjusting, by a programmed computer, the current authentication rating determined for the user based on the second authentication sample result.

* * * * *